A. D. FURSE.
Asbestos Packing.
No. 208,385. Patented Sept. 24, 1878.
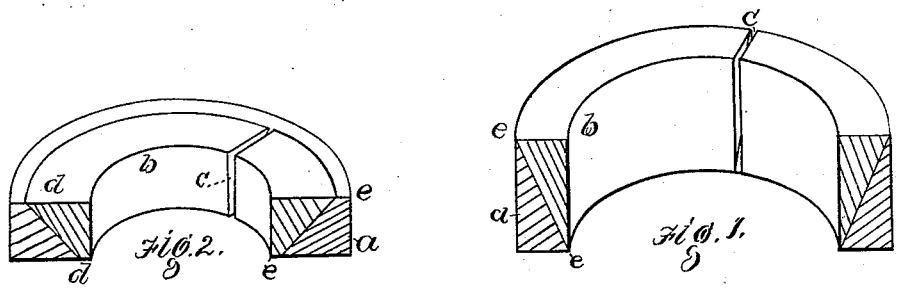
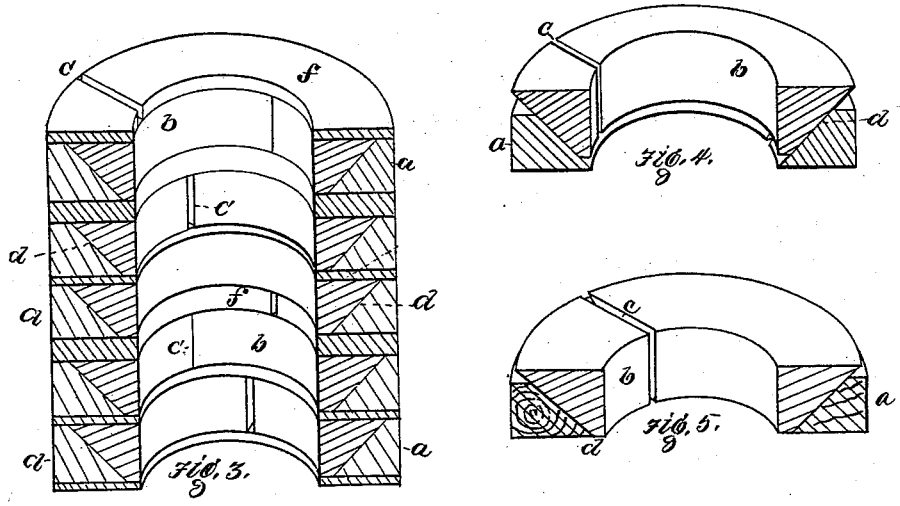
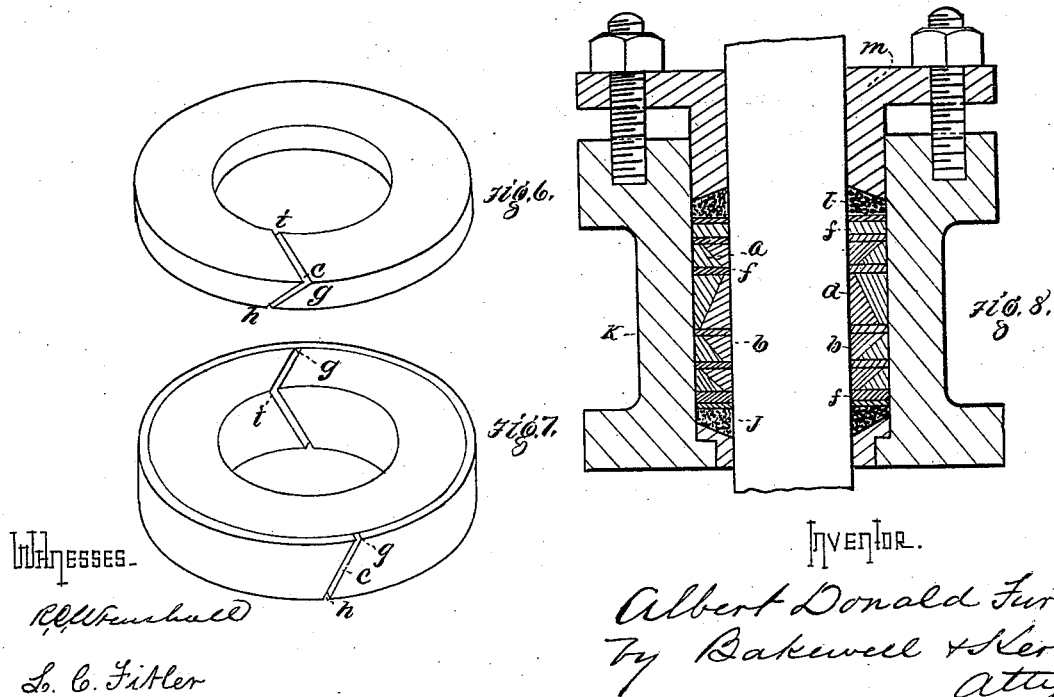
Witnesses:
R. C. Wrenshall
L. C. Fitler
Inventor.
Albert Donald Furse
by Bakewell & Kerr
Attys

UNITED STATES PATENT OFFICE.

ALBERT D. FURSE, OF ROME, ITALY.

IMPROVEMENT IN ASBESTUS PACKING.

Specification forming part of Letters Patent No. 208,385, dated September 24, 1878; application filed August 30, 1878.

*To all whom it may concern:*

Be it known that I, ALBERT DONALD FURSE, of the city of Rome, in the Kingdom of Italy, have invented a new and useful Improvement in Asbestus Packing, of which the following is a specification:

My invention relates to asbestus packing for piston and valve rods, pistons, rams, slide-valves, expansion pipe-joints, and other parts of engines and machinery with moving portions subjected to heat and friction.

By asbestus packing is meant such packing as has asbestus or amianthus as an essential part thereof, both when such asbestus or amianthus is prepared and used by itself, and when mixed or combined with other materials, and also when used in the pure or combined condition, without or with dry, liquid, or other lubricating agents.

In practice, pure asbestus made into millboard by being first pulped and afterward compacted is preferred, and packing so made is called "asbestus open millboard packing."

The main objects of the improvements are to provide a packing which shall be more durable than those hitherto in use, shall be easily applied and removed in glands and containers, and conveniently adjustable in such manner that the working parts may move with minimum friction.

The invention consists in constructing or forming packing-rings of asbestus, cut conically or obliquely, and placed in a reverse direction, one within the other, and in employing the same in conjunction with rings of washer shape, of equal thickness throughout, and which are cut across or have a piece cut out transversely, either with or without loose rope or fiber of asbestus.

The annexed drawings show several ways of carrying my improvements into effect.

Figure 1 is a sectional view of a pair of conical asbestus packing-rings constructed under my invention. $a$, outer ring; $b$, inner ring; $c$, opening to allow of closing up when the ring is worn.

Fig. 2 is a section of a similar pair of rings, in which the sides of the cone are cut from $d$ to $d$, instead of from $e$ to $e$, as in Fig. 1, so as to prevent the corners or edges $e$ from being torn off.

Fig. 3 is a sectional view of a series of packing-rings, placed one above another, as in a stuffing-box. $a$, outer conical rings; $b$, inner conical rings; $c$, openings or cuts to allow of compression; $d$, lines of coning; $f$, flat rings or washers, some being made thicker than others, as shown.

Fig. 4 is a section of another modification of a pair of packing-rings. $a$, outer conical ring; $b$, inner conical ring, made thicker than the outer conical ring.

In Fig. 5 a similar pair of rings is shown, except that the outer ring is made of wood, caoutchouc, or the like.

Fig. 6 is a perspective view of a flat ring or washer, and Fig. 7 a perspective view of a pair of conical rings. $c$, openings made obliquely from $g$ to $h$, and eccentrically from $g$ to $i$.

Fig. 8 is a sectional view, where loose fiber or rope J is placed at the bottom of the stuffing-box K, and where $a\,b\,f$ are a series of conical asbestus rings and washers placed on the top of the loose fiber J. $l$, loose fiber or rope placed on the top of the rings $a\,b\,f$, the whole being kept in position by the gland $m$.

It will be obvious that asbestus packing rings or washers may be cut, shaped, and arranged in a variety of ways under my invention.

I am aware that conical metallic sections have been heretofore employed for the purpose of packing pistons, &c., and that said rings have been caused to jam or pack by the pressure of steam, and also by a screw-follower, and do not claim such subject-matter; but

What I claim is—

1. The packing for pistons, &c., consisting of a series of asbestus rings, cut conically and transversely, and arranged reversely, one within the other, substantially as specified.

2. The packing for pistons, consisting of a series of asbestus rings cut conically, or obliquely and transversely, and arranged reversely, one within the other, in combination with a series of interposed flat rings or washers cut obliquely, the whole substantially as and for the purpose specified.

ALBERT DONALD FURSE.

Witnesses:
ANDREA ORENGO,
VALERIANI VALERIANO.